US012630300B1

(12) United States Patent
Clements et al.

(10) Patent No.: US 12,630,300 B1
(45) Date of Patent: May 19, 2026

(54) BLENDED WING AIRCRAFT

(71) Applicant: General Electric Company, Evendale, OH (US)

(72) Inventors: Jeffrey Donald Clements, Mason, OH (US); Daniel Alan Niergarth, Norwood, OH (US); Arthur William Sibbach, Boxford, MA (US); James Robert Laverty, Center Valley, PA (US)

(73) Assignee: General Electric Company, Evendale, OH (US)

(*) Notice: Subject to any disclaimer, the term of this patent is extended or adjusted under 35 U.S.C. 154(b) by 56 days.

(21) Appl. No.: 19/075,912

(22) Filed: Mar. 11, 2025

(51) Int. Cl.
B64D 33/04 (2006.01)
B64C 39/10 (2006.01)

(52) U.S. Cl.
CPC .............. B64D 33/04 (2013.01); B64C 39/10 (2013.01); B64C 2039/105 (2013.01)

(58) Field of Classification Search
CPC .... B64D 33/04; B64C 2039/105; B64C 39/10
See application file for complete search history.

(56) References Cited

U.S. PATENT DOCUMENTS

| | | | | |
|---|---|---|---|---|
| 2,406,506 | A | | 8/1946 | Northrop |
| 2,504,137 | A | * | 4/1950 | Lewis ..................... B64C 11/48 |
| | | | | 244/65 |
| 3,774,868 | A | | 11/1973 | Goetz |
| 4,019,699 | A | | 4/1977 | Wintersdorff et al. |
| 5,842,666 | A | | 12/1998 | Gerhardt et al. |

| | | | | |
|---|---|---|---|---|
| 5,897,078 | A | * | 4/1999 | Burnham .............. B64C 1/0009 |
| | | | | 244/12.4 |
| 6,382,562 | B1 | * | 5/2002 | Whitlock .................. B64C 3/00 |
| | | | | 244/129.5 |
| 6,568,632 | B2 | | 5/2003 | Page et al. |
| 6,708,924 | B2 | | 3/2004 | Page et al. |
| 6,851,650 | B2 | * | 2/2005 | Sankrithi ................ B64C 39/04 |
| | | | | 244/119 |
| 6,923,403 | B1 | * | 8/2005 | Dizdarevic ........... B64C 1/0009 |
| | | | | 244/36 |

(Continued)

FOREIGN PATENT DOCUMENTS

| | | |
|---|---|---|
| CN | 215064070 U | 12/2021 |
| FR | 2909358 A1 | 6/2008 |

(Continued)

OTHER PUBLICATIONS

Airforce, DAF Selects JetZero to Develop Blended Wing Body Aircraft Prototype, 2023, 2pages. https://www.af.mil/News/Article-Display/Article/3494520/daf-selects-jetzero-to-develop-blended-wing-body-aircraft-prototype/.

(Continued)

*Primary Examiner* — Tye William Abell
(74) *Attorney, Agent, or Firm* — Dority & Manning, P.A.

(57) ABSTRACT

A propulsion system for an aircraft includes a first engine having a first inlet and a first outlet, a second engine having a second inlet and a second outlet, and an exhaust extending in a lateral direction outboard of the first outlet and the second outlet and rearward in a longitudinal direction from the first outlet and the second outlet. The exhaust covers the first outlet and the second outlet. The exhaust includes a mixing region downstream of the first outlet and the second outlet.

18 Claims, 4 Drawing Sheets

(56) References Cited

U.S. PATENT DOCUMENTS

| | | | | |
|---|---|---|---|---|
| 7,509,797 | B2 | 3/2009 | Johnson | |
| 7,644,888 | B2 * | 1/2010 | Eakins | B64C 1/0009 |
| | | | | 244/119 |
| 7,665,689 | B2 | 2/2010 | McComb | |
| 7,793,884 | B2 | 9/2010 | Dizdarevic et al. | |
| 8,104,717 | B2 | 1/2012 | Wakayama et al. | |
| 8,128,023 | B2 | 3/2012 | Cazals | |
| 8,251,310 | B2 | 8/2012 | Marche et al. | |
| 8,317,129 | B1 * | 11/2012 | Lawson | B64D 27/18 |
| | | | | 244/215 |
| 8,366,050 | B2 | 2/2013 | Odle et al. | |
| 8,616,492 | B2 | 12/2013 | Oliver | |
| 9,016,040 | B2 | 4/2015 | Stuart et al. | |
| 9,567,075 | B2 | 2/2017 | Tighe | |
| 9,815,559 | B2 | 11/2017 | Moxon | |
| 10,711,631 | B2 | 7/2020 | Suciu et al. | |
| 11,247,776 | B2 * | 2/2022 | Princen | B64D 27/14 |
| 11,312,491 | B2 | 4/2022 | Morris et al. | |
| 11,396,365 | B2 | 7/2022 | Page | |
| 11,453,483 | B2 | 9/2022 | Page | |
| 11,498,660 | B2 | 11/2022 | Florea et al. | |
| 11,511,854 | B2 | 11/2022 | Baity et al. | |
| 11,572,838 | B2 | 2/2023 | Miller et al. | |
| 11,597,501 | B2 * | 3/2023 | Page | B64C 7/00 |
| 11,597,510 | B2 | 3/2023 | Robertson et al. | |
| 11,608,173 | B2 | 3/2023 | McCullough et al. | |
| 11,827,339 | B1 | 11/2023 | Page | |
| 11,878,798 | B2 | 1/2024 | Atreya et al. | |
| 11,926,410 | B2 | 3/2024 | Page et al. | |
| 2003/0213870 | A1 * | 11/2003 | Eakins | B64C 30/00 |
| | | | | 244/119 |
| 2005/0211822 | A1 * | 9/2005 | Franchet | F02K 3/075 |
| | | | | 244/12.3 |
| 2007/0023571 | A1 * | 2/2007 | Kawai | B64D 27/16 |
| | | | | 244/119 |
| 2008/0121756 | A1 * | 5/2008 | McComb | B64C 15/02 |
| | | | | 244/60 |
| 2010/0163670 | A1 * | 7/2010 | Dizdarevic | B64U 20/77 |
| | | | | 244/36 |
| 2011/0271824 | A1 | 11/2011 | Wahlquist | |
| 2016/0009391 | A1 | 1/2016 | Friesel | |
| 2016/0122005 | A1 | 5/2016 | Florea et al. | |
| 2016/0144972 | A1 | 5/2016 | Florea et al. | |
| 2018/0362169 | A1 | 12/2018 | Du | |
| 2019/0276135 | A1 * | 9/2019 | van Merkensteijn, IV | |
| | | | | B64U 30/10 |
| 2020/0307789 | A1 * | 10/2020 | Princen | B64D 33/06 |
| 2020/0331591 | A1 * | 10/2020 | Page | B64D 27/24 |
| 2022/0194569 | A1 | 6/2022 | Georgeson et al. | |
| 2023/0002037 | A1 | 1/2023 | Page | |
| 2023/0029560 | A1 | 2/2023 | Stefes | |
| 2023/0242254 | A1 | 8/2023 | Page | |
| 2023/0278706 | A1 | 9/2023 | Page et al. | |
| 2023/0322382 | A1 * | 10/2023 | Dindar | B64C 21/01 |
| | | | | 244/36 |

FOREIGN PATENT DOCUMENTS

| | | | |
|---|---|---|---|
| FR | 2938823 | A1 | 5/2010 |
| FR | 2938824 | A1 | 5/2010 |
| GB | 759491 | A | 10/1956 |
| WO | WO2007/104940 | A1 | 9/2007 |
| WO | WO2021/118401 | A1 | 6/2021 |

OTHER PUBLICATIONS

Koenig, Air Force Awards a Start-Up Company $235 Million to Build an Example of a Sleek New Plane, AP News, 2023, 2 Pages. https://apnews.com/article/air-force-aviation-streamlined-plane-blended-wing-2a1704dbe8a3ac112136220eafe291fa.

Prisco, JetZero: Is This New Plane Design the Future of Aviation?, CNN Travel, 2023, https://www.cnn.com/2023/08/21/travel/jetzero-blended-wing-plane-climate-spc/index.html.

* cited by examiner

BLENDED WING AIRCRAFT

FIELD

The present disclosure relates to a blended wing aircraft.

BACKGROUND

Traditional aircraft designs include a fuselage and a pair of wings. The fuselage is a central body of the aircraft that holds passengers, cargo, equipment, and the like. The wings are attached to the fuselage and are the primary lift-generating surfaces, particularly during constant-altitude flight operations. The aircraft can include engines mounted to the wings to generate thrust for the aircraft, and a tail assembly having a vertical stabilizer and a horizontal stabilizer for vector control. While such an aircraft design is a well-established and proven design, improvements to allow for increased efficiency and cargo utilization would be welcomed in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
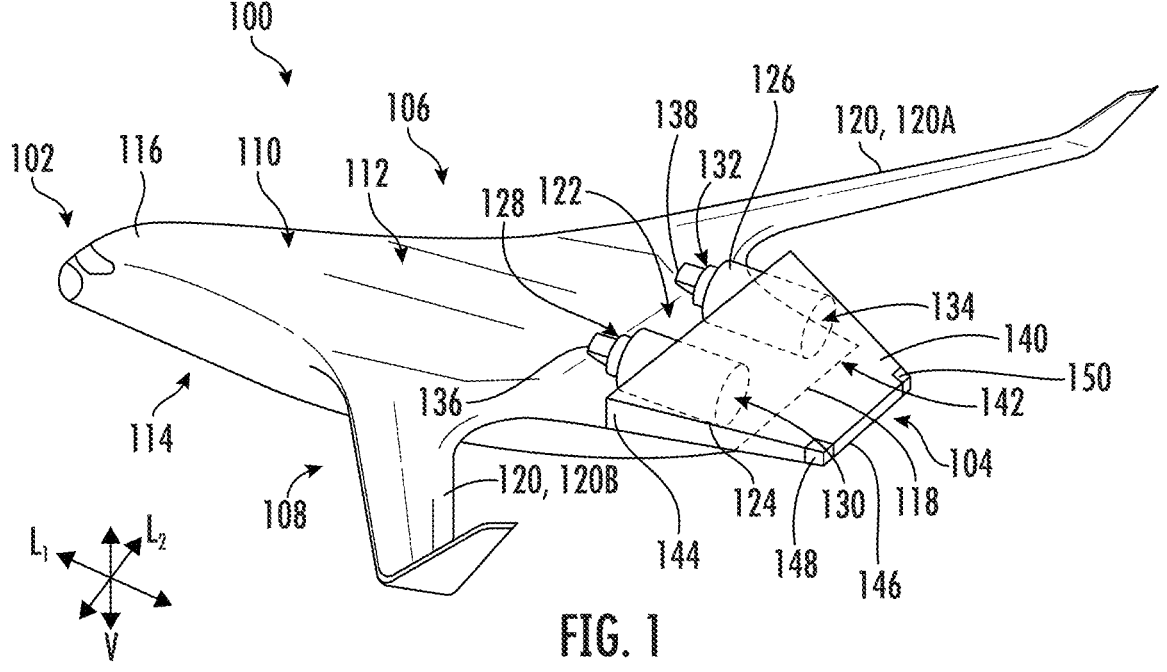
FIG. 1 is a perspective schematic view of an exemplary aircraft.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The terms "forward" and "aft" refer to relative positions within a gas turbine engine or vehicle and are based on a normal operational attitude of the gas turbine engine or vehicle. More particularly, forward and aft are used herein are with reference to a direction of travel and a direction of propulsive thrust of the gas turbine engine or vehicle.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

As used herein, the terms "first," "second," and other ordinals are used to distinguish one component from another and are not intended to signify location or importance of the individual components.

As noted above, improvements to traditional aircraft design to allow for increased efficiency and cargo utilization would be welcomed in the art. The inventors of the present disclosure found that utilization of a blended wing aircraft design can provide such an improvement. In particular, with the blended wing aircraft design, a body of the aircraft can contribute to lift, while also allowing for increased cargo space, improved aerodynamic efficiency, etc.

The present disclosure is generally related to a propulsion system for a blended wing aircraft. Such propulsion systems can have two or more engines that provide thrust to the aircraft mounted, e.g., to a top side of the aircraft. When output varies between the engines, the thrust may shift laterally, causing compensatory action to maintain laterally consistent motion.

By implementing a common exhaust for the engines, exhaust gases mix together to reduce lateral variation and to improve longitudinal motion. The common exhaust extends beyond the outlets of the engines to form a mixing region for the exhaust gases. The exhaust gases mix in the mixing region to form a single rearward exhaust flow, improving forward thrust while reducing lateral compensation from uneven output of the engines.

Figure 2:
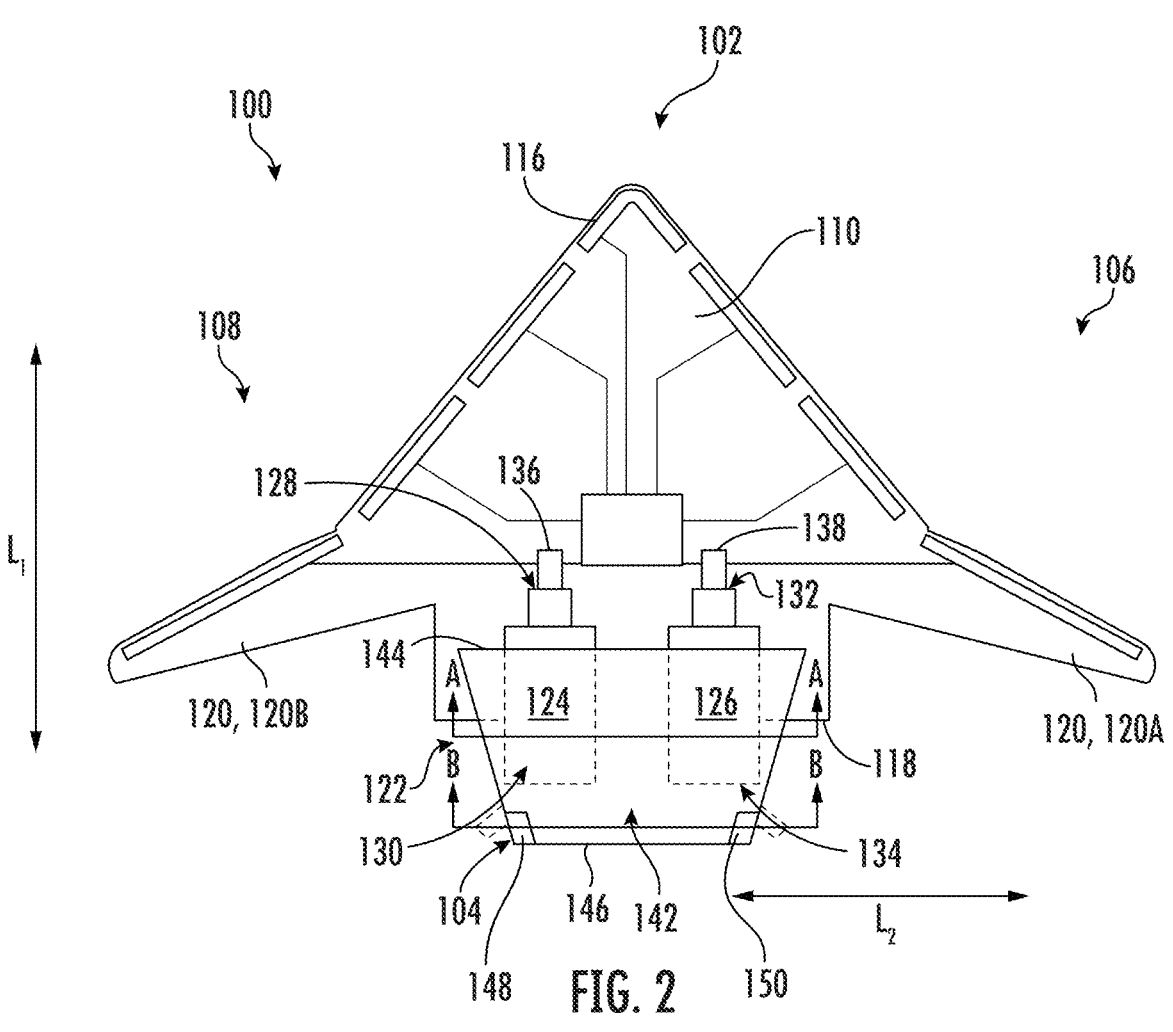
FIG. 2 is a top-down schematic view of the exemplary aircraft of FIG. 1.

Referring now to the drawings, wherein identical numerals indicate the same elements throughout the figures, FIG. 1-2 show an aircraft 100 as may incorporate various embodiments of the present disclosure. In particular, as will be discussed in greater detail, below, the aircraft 100 of FIGS. 1-2 is configured as a blended wing aircraft. FIG. 1 provides a perspective view of the aircraft 100. FIG. 2 provides a top-down view of the aircraft 100.

The aircraft 100 defines a longitudinal direction L1 that extends therethrough, a lateral direction L2, a vertical direction V, a forward end 102 and an opposing aft end 104 along the longitudinal direction L1, a starboard side 106 and an opposing port side 108 along the lateral direction L2. The aircraft 100 includes a body 110 defining a top side 112 and an opposing bottom side 114 along the vertical direction V. It will be appreciated that the body 110 extends longitudinally from a leading edge 116 adjacent to the forward end 102 of the aircraft 100 to a trailing edge 118 adjacent to the aft end 104 of the aircraft 100.

The aircraft 100 includes a pair of wings 120. In particular, the aircraft 100 includes a first wing 120A and a second wing 120B. The first wing 120A extends outwardly from the body 110 generally along the lateral direction L2 on the starboard side 106 and the second wing 120B similarly extends outwardly from the body 110 generally along the lateral direction L2 on the port side 108. Although not depicted, it will be appreciated that each of the wings 120 may include one or more leading edge flaps, one or more trailing edge flaps, or both.

As noted above, the aircraft 100 is configured as a blended wing aircraft. In such a manner, it will be appreciated that the body 110 of the aircraft 100 is generally shaped like an airfoil, such that the body 110 of the aircraft 100 generates upward lift (along the vertical direction V) during steady altitude flight operations. For example, during a cruise operating condition of the aircraft 100, the body 110 may contribute between 10% and 95% of the upward lift for the aircraft 100, such as between 25% and 90% of the upward lift for the aircraft 100, with the remainder being provided by the wings 120. In addition, the wings 120 are aerodynamically contoured to have a smooth transition with the body 110 of the aircraft 100, which can reduce an overall drag on the aircraft 100.

The exemplary aircraft 100 of FIGS. 1-2 also includes a propulsion system 122 disposed on the body 110, specifically on the top side 112 of the aircraft 100. The exemplary propulsion system 122 depicted includes a plurality of engines, and more specifically includes a first engine 124 and a second engine 126. In the embodiment depicted, the first engine 124 and the second engine 126 are spaced from one another along the lateral direction L2 and are mounted to the body 110 of the aircraft 100 at the aft end 104 of the aircraft 100. It will be appreciated, that as used herein, the term "at the aft end 104" refers to a location along the longitudinal direction L1 closer to the aft end 104 of the aircraft 100 than the forward end 102 of the aircraft 100. Briefly, it will further be appreciated that for the embodiment depicted, the first engine 124 and second engine 126 are mounted to the body 110 of the aircraft 100 on the top side 112 of the aircraft 100. The first engine 124, the second engine 126, or both may be gas turbine engines.

It will be appreciated, however, that in other exemplary embodiments, the first engine 124 and second engine 126 may be mounted to the body 110, e.g., on the bottom side 114. Further, although the first engine 124 and second engine 126 are coupled to the body 110 in the embodiment shown, in other embodiments, they may be formed integrally with the body 110.

The first engine 124 includes a first inlet 128 and a first outlet 130, and the second engine 126 includes a second inlet 132 and a second outlet 134. Air enters the first and second inlets 128, 132, combusts with fuel, and exits the first and second outlets 130, 134 to provide thrust to the aircraft 100. To assist in providing air into the first and second inlets 128, 132, the body may define a first air inlet 136 that feeds air into the first engine 124 and a second air inlet 138 that feeds air into the second engine 126. The first air inlet 136 and the second air inlet 138 may be depressions formed in the body 110 that draw air into the first and second inlets 128, 132.

The aircraft 100 includes an exhaust 140. The exhaust 140 allows for mixing of exhaust gases from the first outlet 130 of the first engine 124 and the second outlet 134 of the second engine 126. In particular, the exhaust 140 may at least partially cover the first outlet 130 and the second outlet 134. More specifically, at least a portion of the exhaust 140 extends aft of the first outlet 130 and the second outlet 134 to define a mixing region 142 downstream of the first outlet 130 and the second outlet 134. In the mixing region 142, exhaust gases from the first and second outlets 130, 134 mix to form a combined flow, which reduces control surfaces when either the first engine 124 or the second engine 126 is inoperable, improves noise attenuation from reduced exhaust velocity, and improves performance with greater aircraft boundary layer control. In one form, the exhaust 140 extends aft of the trailing edge 118, directing exhaust gases away from the body 110. In such a form, the mixing region 142 is disposed forward of the trailing edge 118.

The exhaust 140 tapers from an exhaust inlet 144 to an exhaust outlet 146. That is, a width in the lateral direction L2 at the exhaust inlet 144 is greater than a width in the lateral direction L2 at the exhaust outlet 146. Specifically, the exhaust inlet 144 extends from a first location between the first engine 124 and the port side 108 of the aircraft 100 to a second location between the second engine 126 and the starboard side 106 of the aircraft 100, wider than a width from a port side of the first engine 124 to a starboard side of the second engine 126. The tapering of the exhaust 140 focuses flow of exhaust gases, reducing side-to-side variations and improving balance of the thrust in the lateral direction L2.

The exhaust 140 is arranged to encapsulate at least a portion of each of the first engine 124 and the second engine 126. More specifically, as shown in FIG. 2, the exhaust inlet 144 is disposed between the respective inlets 128, 132 of the first and second engines 124, 126 and the respective outlets 130, 134 of the first and second engines 124, 126, and the exhaust outlet 146 extends aft of the first outlet 130 and the second outlet 134. The arrangement of the exhaust 140 allows the first inlet 128 and the second inlet to receive air uninterrupted while providing the mixing region 142 aft of the first outlet 130 and the second outlet 134. In particular, a conventional exhaust allows air to flow laterally, increasing aircraft control surfaces and decreasing boundary layer control. By placing the exhaust 140 between the inlets 128, 132 of the first and second engines 124, 126 and the outlets 130, 134 of the first and second engines 124, 126 to taper the combined exhaust gases, the resultant output flow has increased longitudinal motion that improves thrust output, reduces aircraft control surfaces and exhaust noise, and improves boundary layer control.

The exhaust 140 may be designed to protect one or more components of the aircraft 100, including the first and second engines 124, 126. In particular, the exhaust 140 may be formed of a metal or a composite material that absorbs energy from impacts and other kinetic forces. The exhaust 140 may be formed in an energy-attenuating configuration, such as a honeycomb or other density-reducing shape intended to deform upon impact. In such a form, the exhaust 140 may be designed to deform for energy absorption while maintaining an overall shape to direct the exhaust gases from the first and second outlets 130, 134.

The aircraft 100 includes a first rudder 148 and a second rudder 150, each extending from the exhaust 140. The first and second rudders 148, 150 provide additional control for turning the aircraft 100. The first and second rudders 148, 150 are disposed aft of the first outlet 130 and the second outlet 134 to direct the exhaust gases. As shown in FIG. 2, the first rudder 148 is disposed on a port side of the exhaust 140 and the second rudder 150 is disposed on a starboard side of the exhaust 140. Each of the first and second rudders 148, 150 is movable between respective first positions (shown in solid lines in FIG. 2) and respective second positions (shown in dashed lines in FIG. 2) to direct the exhaust gases, improving maneuverability of the aircraft 100. More specifically, a controller (not shown) is configured to activate respective motors or actuators that rotate the first and second rudders 148, 150 to specific positions to control yaw of the aircraft 100.

Figure 3A:
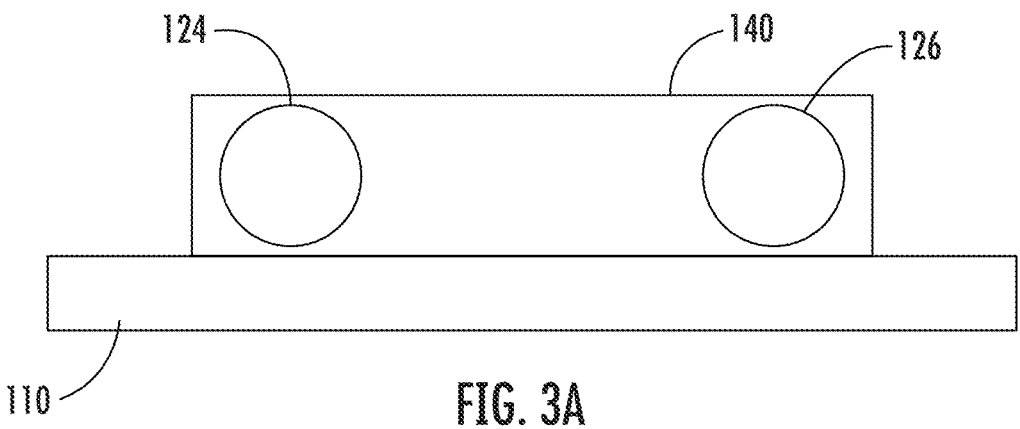
FIG. 3A is a cross-sectional view of a propulsion of the exemplary aircraft of FIG. 2.

Now referring to FIG. 3A, a cross-sectional view of the exhaust 140 is shown. More specifically, FIG. 3A shows a portion of the exhaust 140 upstream of the first outlet 130 of the first engine 124 and the second outlet 134 of the second engine 126. As described above, the exhaust 140 extends outboard of the first engine 124 and the second engine 126 in the lateral direction L2. That is, the exhaust 140 encloses the first engine 124 and the second engine 126, trapping exhaust gases in the exhaust 140 and directing the combined exhaust gases away from the first and second engines 124, 126.

Figure 3B:
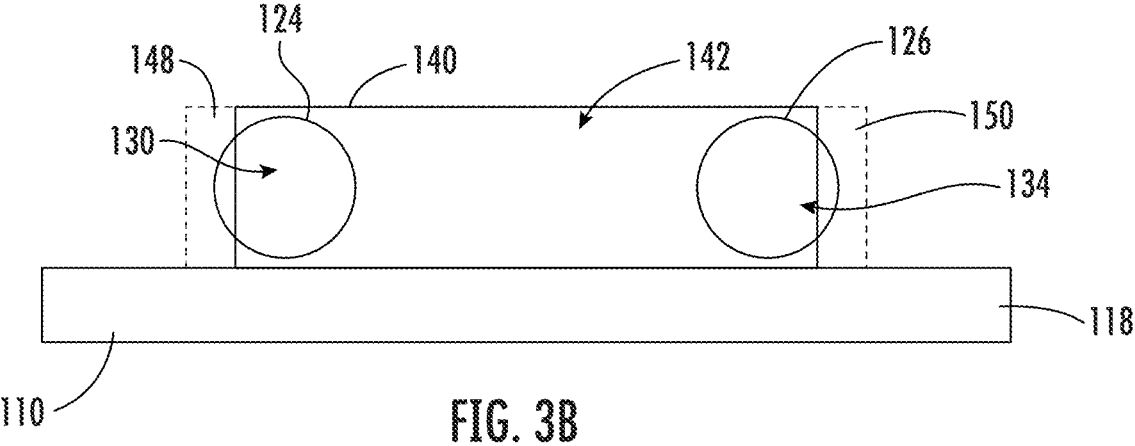
FIG. 3B is a second cross-sectional view of a propulsion of the exemplary aircraft of FIG. 2.

Now referring to FIG. 3B, another cross-sectional view of the exhaust 140 is shown. The portion of the exhaust 140 in FIG. 3B includes the mixing region 142, where exhaust gases from the first outlet 130 and the second outlet 134 begin to mix. By mixing the exhaust gases from the first engine 124 and the second engine 126 in the mixing region 142, operation of the aircraft 100 is improved. More specifically, operation of the aircraft 100 is improved because the mixing region 142 reduces lateral movement of the exhaust gases from the first and second engines 124, 126, which focuses movement of the exhaust gases in the longitudinal direction. In such a form, when output from one of the first or second engines 124, 126 differs from output from the other of the first or second engines 124, 126, the mixing region 142 equalizes the lateral momentum of the exhaust gases to provide a consistent longitudinal output from the exhaust outlet 146. The mixing region 142 thus compensates for uneven output from the first and second engines 124, 126, reducing aircraft control surfaces and reducing uneven lateral movement of the aircraft 100. Additionally, mixing the exhaust gases from the first and second engines 124, 126 may reduce the weight and complexity of the shape of the exhaust 140 and reduce the speed of the exhaust gases, reducing overall noise.

Additionally, FIG. 3B shows a portion of the exhaust 140 downstream of the first outlet 130 and the second outlet 134 that includes the first rudder 148 and the second rudder 150. FIG. 3B shows the first rudder 148 and the second rudder 150 in the respective first positions in solid lines and the respective second positions in dashed lines. In particular, in the first position, the first rudder 148 and the second rudder 150 are flush with the rest of the exhaust 140. The first rudder 148 and the second rudder 150 are individually actuatable to a position from the first position to the second position to provide specific thrust direction for the exhaust gases. For example, the first rudder 148 and the second rudder 150 may each be actuated to their respective first positions to narrow the flow of the exhaust gases, increasing thrust for the aircraft 100. In another example, the first rudder 148 may be actuated to the first position and the second rudder 150 may be actuated to the second position to direct the exhaust gases to starboard, providing additional starboard thrust to assist in a left turn. In particular, when the exhaust 140 is deformed from an impact, the first and second rudders 148, 150 may be actuated to specific, different positions to provide consistent rearward thrust for the aircraft 100.

Figure 4:
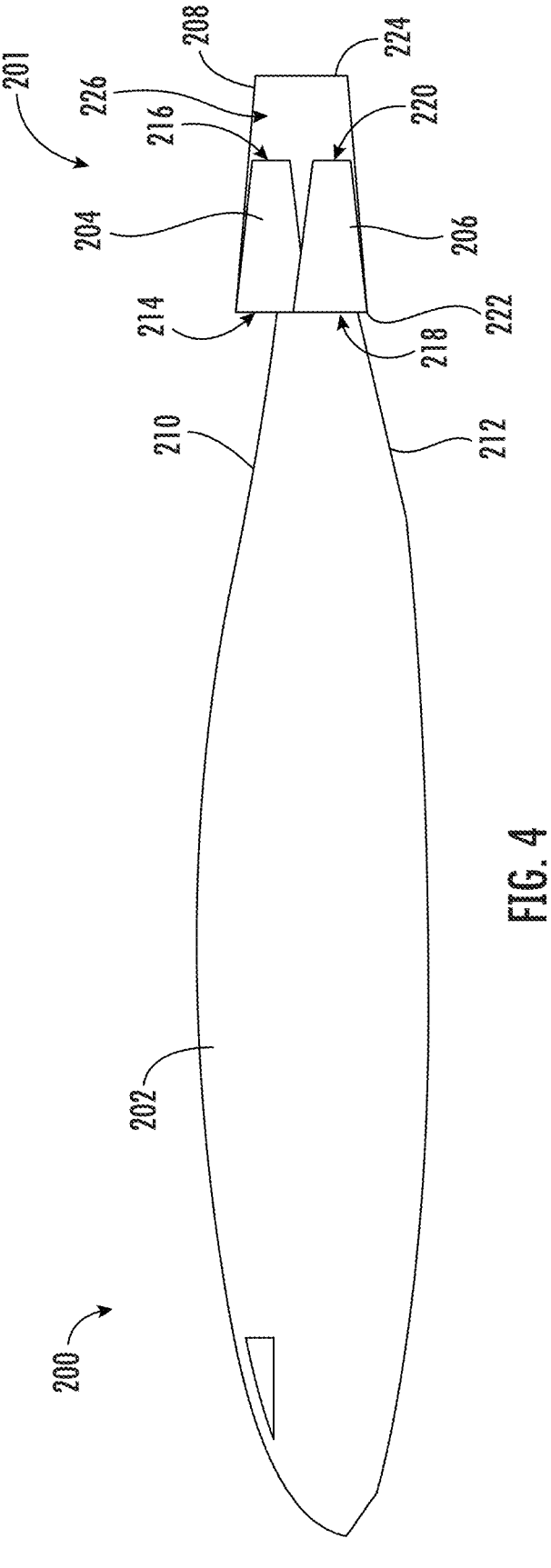
FIG. 4 is a side schematic view of another exemplary aircraft.

With reference to FIG. 4, another exemplary aircraft 200 is shown. As with the aircraft 100, the aircraft 200 includes a propulsion system 201 and a body 202. The propulsion system 201 includes a first engine 204 disposed on the body 202, a second engine 206 disposed on the body 202, and an exhaust 208. In FIG. 4, the first engine 204 is disposed vertically above the second engine 206. That is, the first engine 204 is disposed on a top side 210 of the body 202, and the second engine 204 is disposed on a bottom side 212 of the body 202. The first engine 204 includes a first inlet 214 and a first outlet 216, and the second engine 206 includes a second inlet 218 and a second outlet 220, and the first outlet 216 is disposed vertically above the second outlet 220. The vertical arrangement of the first and second engines 204, 206 reduces a total amount of space used on the top side 210 of the aircraft 200.

The exhaust 208 extends vertically above the first engine 204 and below the second engine 206. As with the exhaust of FIGS. 1-3B, the exhaust 208 extends from an exhaust inlet 222 forward in the longitudinal direction L1 of the first and second outlets 216, 220 to an exhaust outlet 224 aft of the first and second outlets 216, 220. The exhaust 208 defines a mixing region 226 downstream of the first and second outlets 216, 220 for exhaust gases to mix prior to exiting through the exhaust outlet 224. While not shown in FIG. 4, it will be appreciated that the exhaust 204 may include one or more rudders to direct the exhaust gases out from the exhaust outlet 224.

The exhaust 208 tapers from the exhaust inlet 222 to the exhaust outlet 224. More specifically, the exhaust inlet 222 has a vertical height that is greater than a vertical height of the exhaust outlet 224. The tapering of the exhaust 208 focuses the exhaust gases, increasing a speed at which the exhaust gases exit the exhaust outlet 224. The increased speed of the exhaust gases focuses the direction of the thrust in the rearward direction. That is, when output from the first and second engines 204, 206 is uneven, the aircraft 200 may tip vertically up or down, and the tapered exhaust 208 reduces the vertical variation of the flow of the exhaust gases to help stabilize the aircraft 200.

The common exhaust for the engines causes the exhaust gases mix together, reducing lateral variation in the propulsion system and improving longitudinal motion of the aircraft. That is, the exhaust gases mix in the mixing region to form a single rearward exhaust flow, improving forward thrust while reducing lateral compensation from uneven output of the engines. Additionally, mixing the exhaust gases from the first and second engines of the propulsion system may reduce the weight and complexity of the shape of the exhaust and reduce the speed of the exhaust gases, reducing overall noise output by the aircraft. Such features are beneficial for blended wing aircraft that have space limitations and are sensitive to lateral imbalance.

Further aspects are provided by the subject matter of the following clauses:

A blended wing aircraft includes a body, a pair of wings extending outward from the body; and a propulsion system disposed on the body, the propulsion system including a first engine having a first outlet, a second engine having a second outlet; and an exhaust extending aft from the first outlet and the second outlet covering the first outlet and the second outlet, the exhaust defining a mixing region downstream of the first outlet and the second outlet.

The blended wing aircraft of any of the previous clauses, further including a rudder extending from the exhaust.

The blended wing aircraft of any of the previous clauses, wherein the rudder is disposed aft of the first outlet and the second outlet.

The blended wing aircraft of any of the previous clauses, further including a second rudder extending from the exhaust, wherein the rudder is disposed on a port side of the exhaust and the second rudder is disposed on a starboard side of the exhaust.

The blended wing aircraft of any of the previous clauses, wherein the exhaust tapers from an exhaust inlet to an exhaust outlet.

The blended wing aircraft of any of the previous clauses, wherein the first outlet and the second outlet are disposed between the exhaust inlet and the exhaust outlet.

The blended wing aircraft of any of the previous clauses, wherein the first outlet is disposed vertically above the second outlet.

The blended wing aircraft of any of the previous clauses, wherein the first engine or the second engine is a gas turbine engine.

The blended wing aircraft of any of the previous clauses, wherein the blended wing aircraft defines a top side, and the propulsion is mounted to the top side of the blended wing aircraft.

The blended wing aircraft of any of the previous clauses, wherein the blended wing aircraft defines a trailing edge, wherein the exhaust extends aft of the trailing edge of the blended wing aircraft.

The blended wing aircraft of any of the previous clauses, wherein the mixing region is disposed forward of the trailing edge.

The blended wing aircraft of any of the previous clauses, wherein the body defines a first air inlet into the first engine and a second air inlet into the second engine.

The blended wing aircraft of any of the previous clauses, wherein the blended wing aircraft defines a port side and a starboard side, and the exhaust extends from a first location between the first engine and the port side to a second location between the second engine and the starboard side.

The blended wing aircraft of any of the previous clauses, wherein the first engine has a first inlet and the second engine has a second inlet, and the exhaust includes an exhaust inlet disposed aft of the first inlet and the second inlet.

A propulsion system for an aircraft, the propulsion system including a first engine having a first inlet and a first outlet, a second engine having a second inlet and a second outlet, and an exhaust extending in a lateral direction outboard of the first outlet and the second outlet and rearward in a longitudinal direction from the first outlet and the second outlet, the exhaust covering the first outlet and the second outlet, the exhaust including a mixing region downstream of the first outlet and the second outlet.

The propulsion system of any of the previous clauses, wherein the exhaust tapers from an exhaust inlet to an exhaust outlet.

The propulsion system of any of the previous clauses, wherein the first outlet is disposed vertically above the second outlet.

The propulsion system of any of the previous clauses, wherein the exhaust has a port side that extends port in the lateral direction from the first outlet and a starboard side that extends starboard in the lateral direction from the second outlet.

The propulsion system of any of the previous clauses, wherein the exhaust further includes an exhaust inlet, wherein the exhaust inlet is forward in the longitudinal direction of the first inlet and the second inlet.

The propulsion system of any of the previous clauses, wherein the exhaust further includes an exhaust inlet, wherein the exhaust inlet is aft in the longitudinal direction of the first inlet and the second inlet.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A blended wing aircraft comprising:
   a body;
   a pair of wings extending outward from the body; and
   a propulsion system disposed on the body, the propulsion system comprising:
   a first engine having a first outlet;
   a second engine having a second outlet; and
   an exhaust covering the first engine and the second engine and covering the first outlet and the second outlet, the exhaust defining a mixing region aft of the first outlet and the second outlet,
   wherein the first engine has a first inlet and the second engine has a second inlet, and the exhaust includes an exhaust inlet disposed aft of the first inlet and the second inlet and an exhaust outlet disposed aft of the first outlet and the second outlet.

2. The blended wing aircraft of claim 1, wherein the first outlet is disposed vertically above the second outlet.

3. The blended wing aircraft of claim 1, wherein the first engine or the second engine is a gas turbine engine.

4. The blended wing aircraft of claim 1, wherein the blended wing aircraft defines a top side, and the propulsion is mounted to the top side of the blended wing aircraft.

5. The blended wing aircraft of claim 1, wherein the body defines a first air inlet into the first engine and a second air inlet into the second engine.

6. The blended wing aircraft of claim 1, wherein the blended wing aircraft defines a port side and a starboard side, and the exhaust extends from a first location between the first engine and the port side to a second location between the second engine and the starboard side.

7. The blended wing aircraft of claim 1, wherein the mixing region is between the first outlet and the exhaust outlet.

8. The blended wing aircraft of claim 1, wherein the exhaust tapers from the exhaust inlet to the exhaust outlet.

9. The blended wing aircraft of claim 8, wherein the first outlet and the second outlet are disposed between the exhaust inlet and the exhaust outlet.

10. The blended wing aircraft of claim 1, wherein the blended wing aircraft defines a trailing edge, wherein the exhaust extends aft of the trailing edge of the blended wing aircraft.

11. The blended wing aircraft of claim 10, wherein the mixing region is disposed forward of the trailing edge.

12. The blended wing aircraft of claim 1, further comprising a rudder extending from the exhaust and configured to rotate port or starboard relative to the exhaust.

13. The blended wing aircraft of claim 12, wherein the rudder is disposed aft of the first outlet and the second outlet.

14. The blended wing aircraft of claim 12, wherein the rudder is a first rudder, and further comprising a second rudder extending from the exhaust, wherein the first rudder is disposed on a port side of the exhaust and the second rudder is disposed on a starboard side of the exhaust.

15. A propulsion system for an aircraft, the propulsion system comprising:
   a first engine having a first inlet and a first outlet;
   a second engine having a second inlet and a second outlet; and an exhaust covering the first engine and the second engine and extending in a lateral direction outboard of the first outlet and the second outlet and rearward in a longitudinal direction from the first outlet and the second outlet, the exhaust including an exhaust inlet aft of the first inlet and the second inlet, the exhaust covering the first outlet and the second outlet, the exhaust including a mixing region aft of the first outlet and the second outlet.

16. The propulsion system of claim 15, wherein the exhaust tapers from the exhaust inlet to an exhaust outlet.

17. The propulsion system of claim 15, wherein the first outlet is disposed vertically above the second outlet.

18. The propulsion system of claim 15, wherein the exhaust has a port side that extends port in the lateral direction from the first outlet and a starboard side that extends starboard in the lateral direction from the second outlet.

\* \* \* \* \*